(12) United States Patent
Andersen (10) Patent No.: US 9,702,136 B2
(45) Date of Patent: Jul. 11, 2017

(54) HIGH PRESSURE FLUID SPRAY NOZZLE INCORPORATING A FLOW CONTROLLED SWITCHING VALVE

(71) Applicant: STONEAGE, INC., Durango, CO (US)

(72) Inventor: Colton Andersen, Durango, CO (US)

(73) Assignee: STONEAGE, INC., Durango, CO (US)

( * ) Notice: Subject to any disclaimer, the term of this patent is extended or adjusted under 35 U.S.C. 154(b) by 75 days.

(21) Appl. No.: 14/962,894

(22) Filed: Dec. 8, 2015

(65) Prior Publication Data

US 2016/0091096 A1 Mar. 31, 2016

Related U.S. Application Data

(62) Division of application No. 14/553,612, filed on Nov. 25, 2014, now Pat. No. 9,395,001.
(Continued)

(51) Int. Cl.
*B05B 1/30* (2006.01)
*E03F 9/00* (2006.01)
(Continued)

(52) U.S. Cl.
CPC ............ *E03F 9/005* (2013.01); *B05B 1/1681* (2013.01); *B05B 1/3013* (2013.01);
(Continued)

(58) Field of Classification Search
CPC ... B05B 1/1681; B05B 1/3013; B05B 7/2435; B08B 9/0433; B08B 9/0495; E03F 9/005;
(Continued)

(56) References Cited

U.S. PATENT DOCUMENTS 3,707,168 A 12/1972 Boelkins
3,774,634 A 11/1973 Bonney
(Continued)

FOREIGN PATENT DOCUMENTS

DE 19620783 5/1997

OTHER PUBLICATIONS

International Search Report and Written Opinion, dated Aug. 14, 2012, from related, co-owned International Application No. PCT/US2012/024001.
(Continued)

*Primary Examiner* — Davis Hwu
(74) *Attorney, Agent, or Firm* — Greenberg Traurig, LLP (57) ABSTRACT

A nozzle assembly comprises a hollow nozzle body having a central bore and a plurality of ports extending through the body from the central bore; and a switching valve cartridge disposed in the central bore that directs fluid flow to ports upon application of fluid flow above a predetermined threshold to the inlet and direct fluid flow to different ports upon fluid flow having subsequently dropped below the predetermined threshold and then exceeding the predetermined threshold. The cartridge comprises a cylindrical cartridge case having a front portion and a cup shaped rear portion, a cylindrical poppet slidably disposed within the cup shaped rear portion of the cartridge case, and a biasing member within the cartridge case between the front portion of the case and the poppet urging the poppet away from the front portion of the cartridge case.

6 Claims, 7 Drawing Sheets

Related U.S. Application Data (60) Provisional application No. 61/955,056, filed on Mar. 18, 2014.

(51) Int. Cl.
  *B05B 1/16* (2006.01)
  *B08B 9/043* (2006.01)
  *B08B 9/049* (2006.01)
  *F16K 1/32* (2006.01)
  *F16K 11/04* (2006.01)
  *F16K 11/044* (2006.01)

(52) U.S. Cl.
  CPC .......... *B08B 9/0433* (2013.01); *B08B 9/0495* (2013.01); *E03F 9/00* (2013.01); *F16K 1/32* (2013.01); *F16K 11/04* (2013.01); *F16K 11/044* (2013.01); *Y10T 137/6011* (2015.04)

(58) Field of Classification Search
  CPC .... E03F 9/00; F16K 1/32; F16K 11/04; F16K 11/044
  USPC .............................................. 239/581.1, 569
  See application file for complete search history.

(56) References Cited

U.S. PATENT DOCUMENTS

| | | | |
|---|---|---|---|
| 3,921,660 A | 11/1975 | Kowalski | |
| 4,483,483 A * | 11/1984 | Grime | B05B 7/2435 239/526 |
| 4,615,482 A | 10/1986 | Marusiak et al. | |
| 4,744,285 A | 5/1988 | Presley | |
| 4,921,002 A | 5/1990 | Christon et al. | |
| 4,934,402 A | 6/1990 | Tarnay et al. | |
| 5,551,458 A | 9/1996 | Faxon | |
| 5,855,742 A | 1/1999 | Lumbroso et al. | |
| 6,059,202 A | 5/2000 | Zink et al. | |
| 6,237,622 B1 | 5/2001 | Cook et al. | |
| 6,279,594 B1 | 8/2001 | Beitzel et al. | |
| 6,390,390 B1 * | 5/2002 | Hung | B05B 1/3013 239/525 |
| 6,478,041 B1 | 11/2002 | Stede | |
| 6,702,206 B2 * | 3/2004 | Wu | B05B 1/3013 239/525 |
| 7,025,291 B2 * | 4/2006 | Wu | B05B 1/3013 239/525 |
| 7,802,588 B2 | 9/2010 | Doutt | |
| 8,667,987 B2 | 3/2014 | Zink | |
| 8,863,775 B2 | 10/2014 | Zink et al. | |
| 8,940,108 B2 | 1/2015 | Stutchbury | |
| 2002/0092566 A1 | 7/2002 | Rhone et al. | |
| 2004/0261822 A1 | 12/2004 | Ura | |
| 2007/0199601 A1 | 8/2007 | Imhof | |
| 2009/0212244 A1 | 8/2009 | Pfaff et al. | |
| 2010/0327208 A1 | 12/2010 | Doutt | |
| 2012/0205405 A1 | 8/2012 | Zink et al. | |

OTHER PUBLICATIONS

International Search Report and Written Opinion, dated May 19, 2015, from corresponding, co-owned International Application No. PCT/US2015/016398.

Examination/Search Report dated May 9, 2014, from related Singapore Application No. 201305622-1.

* cited by examiner

HIGH PRESSURE FLUID SPRAY NOZZLE INCORPORATING A FLOW CONTROLLED SWITCHING VALVE

CROSS REFERENCE TO RELATED APPLICATIONS

This application is a divisional of U.S. patent application Ser. No. 14/553,612, filed Nov. 25, 2014, which claims the benefit of priority of U.S. Provisional Patent Application Ser. No. 61/955,056, filed Mar. 18, 2014, having the same title. This application is related to U.S. patent application Ser. No. 13/367,080, filed Feb. 14, 2012, having the same title, now U.S. Pat. No. 8,863,775, issued Oct. 21, 2014, each of which is hereby incorporated by reference in its entirety.

BACKGROUND OF THE DISCLOSURE

Traction nozzles are used in sewer pipe lines and other piping systems to assist in pulling high pressure hose into the pipe to reach obstructions requiring removal. These traction nozzles have jet tips oriented at an angle rearward in order to generate thrust in the nozzle within the pipe to assist in puffing the hose through and along long stretches of pipe and around pipe bends. These nozzles have forward directed jet tips and may also have laterally directed tips to ablate the obstructions encountered. However, the forward directed jet tips produce a counter force against forward travel of the nozzle through the pipe. This counterforce hinders effective deployment of the high pressure hose and reduces the net pulling force produced by the traction nozzle on the high pressure hose. Thus there is a need for a switching mechanism that does not generate a counterforce during traction operation, yet facilitates operation of an effective fluid jet nozzle during actual cleaning operations. Furthermore, there is a need for a nozzle assembly incorporating a switching valve assembly that is replaceable and has a minimum number of component parts in order to simplify design and maintenance of such a nozzle assembly.

SUMMARY OF THE DISCLOSURE

An exemplary embodiment of a nozzle assembly in accordance with the present disclosure includes a hollow nozzle head body containing a switching valve cartridge assembly captured in the body by an inlet nut fastened to the nozzle body. The cartridge assembly includes a generally cylindrical cartridge case slidably disposed in the nozzle body, a movable poppet disposed in the cartridge case, and a bias member resiliently biasing the poppet toward the inlet nut at a rear end of the cartridge case.

This nozzle assembly more particularly includes a hollow nozzle body having a central bore and a plurality of ports extending through the body from the central bore. A switching valve cartridge is disposed in the central bore. This cartridge is operable to direct fluid flow from an inlet to at least one of the plurality of ports upon application of fluid flow above a predetermined threshold to the inlet and direct fluid flow from the inlet to at least a different one of the plurality of ports upon fluid flow having subsequently dropped below the predetermined threshold and then exceeding the predetermined threshold.

The cartridge includes a cylindrical cartridge case having a front portion and a cup shaped rear portion, a cylindrical poppet slidably disposed within the cup shaped rear portion of the cartridge case, and a biasing member within the cartridge case disposed between the front portion of the case and the poppet. This biasing member is preferably a coil spring. The spring urges the poppet away from the front portion of the cartridge case.

The cartridge preferably includes one or more of guide members engaging the poppet to alternatingly align the poppet with the at least one of the plurality of ports and the different one of the plurality of ports each time the poppet abuts the front portion of the case. The guide members are preferably pins through a side wall of the cartridge case projecting radially inward from the rear portion of the cartridge case that engage a corresponding feature on the poppet.

The poppet has at least one through bore to permit fluid flow therethrough and the corresponding feature. This feature preferably is a peripheral zigzag groove. Each transition below the predetermined threshold causes the poppet to rotate about its axis to permit fluid flow to alternate between the first and second set of ports.

The front portion of the cartridge case has at least one bore therethrough leading to the first set of ports and at least one other bore therethrough leading to the second set of ports. The poppet has a front face and at least one lug protruding from the front face for selectively closing the at least one bore through the front portion of the cartridge case. The guide members rotate the poppet a predetermined amount, for example 22.5° each time the poppet moves toward or away from the front portion of the cartridge case.

The cartridge case preferably has two or more axial bores through the front portion equally spaced about a central axis through the cartridge case and two or more angled bores through the front portion extending to an annular channel that extends around the front portion of the cartridge case. The poppet has a front face, at least two through bores spaced about the central axis, and at least two lugs protruding from the front face for selectively engaging the axial and angled bores through the front portion of the cartridge case depending on a rotational position of the poppet within the rear portion of the cartridge case.

An embodiment of a nozzle assembly in accordance with the present disclosure includes a hollow nozzle body connectable to a high pressure fluid supply. The nozzle body has a central bore, a first plurality of ports extending out of the body from one end of the central bore and a second plurality of ports extending out of the body from a side of the central bore. A switching valve cartridge assembly is disposed in the central bore that is operable to direct fluid flow from an inlet to one or more of the first plurality of ports upon application of fluid flow above a predetermined threshold to the inlet and direct fluid flow from the inlet to one or more of the second plurality of ports upon fluid flow dropping below the predetermined threshold and then exceeding the predetermined threshold again.

The cartridge assembly in this embodiment includes a cartridge case disposed in the central bore of the hollow body. The cartridge case has a front portion and a cup shaped rear portion. The front portion has a first plurality of bores therethrough for passage of fluid to the first plurality of ports and a second plurality of bores therethrough for passage of fluid to the second plurality of ports.

A cylindrical poppet is slidably disposed in the rear portion of the cartridge case. This poppet has a plurality of axially extending poppet bores therethrough. A biasing member within the rear portion of the cartridge case extending between the front portion and the poppet urges the poppet away from the front portion of the cartridge case such that, absent fluid flow through the nozzle assembly, the poppet abuts against a retaining nut that captures the cartridge within the nozzle body. A guide member that extends between the rear portion of the cartridge case and the poppet engages a corresponding feature on the poppet to rotate the poppet as it slides forward and rearward within the rear portion of the cartridge case.

The poppet has a front face and a plurality of lugs protruding from the front face each closing one of the bores through the cartridge case when the poppet abuts against front portion of the cartridge case. The poppet has a zigzag peripheral annular groove engaging the guide member. This engagement causes the poppet to rotate in only one direction a predetermined amount about a central axis through the assembly each time fluid flow transitions above and below the predetermined threshold. The bores through the poppet align with one or more of the bores through the cartridge case when the poppet abuts against the front portion of the cartridge case.

One embodiment of a switching valve cartridge for use in a nozzle body in accordance with the present disclosure includes a generally tubular cartridge case having a front portion and a cup shaped rear portion. The front portion has a peripheral annular channel and a first plurality of axial bores therethrough for axial passage of fluid out of the front end and a second plurality of bores therethrough for passage of fluid to the annular channel. The cartridge also includes a cylindrical poppet slidably disposed in the rear portion of the cartridge case. This poppet has a plurality of axially extending poppet bores therethrough. A biasing member is disposed within the rear portion of the cartridge case between the front portion and the poppet. This biasing member is preferably a coil spring that biases the poppet away from the front portion of the cartridge case absent sufficient fluid flow to overcome the spring force. A guide member extends between the rear portion of the cartridge case and the poppet and engages a corresponding feature on the poppet to rotate the poppet as it slides forward and rearward within the rear portion of the cartridge case.

The poppet has a front face and a plurality of lugs protruding from the front face each closing one of the bores through the cartridge case when the poppet abuts against front portion of the cartridge case. The bores through the poppet align with one or more of the bores through the cartridge case when the poppet abuts against the front portion of the cartridge case.

Further features, advantages and characteristics of the embodiments of this disclosure will be apparent from reading the following detailed description when taken in conjunction with the drawing figures.

DETAILED DESCRIPTION

Figure 1:
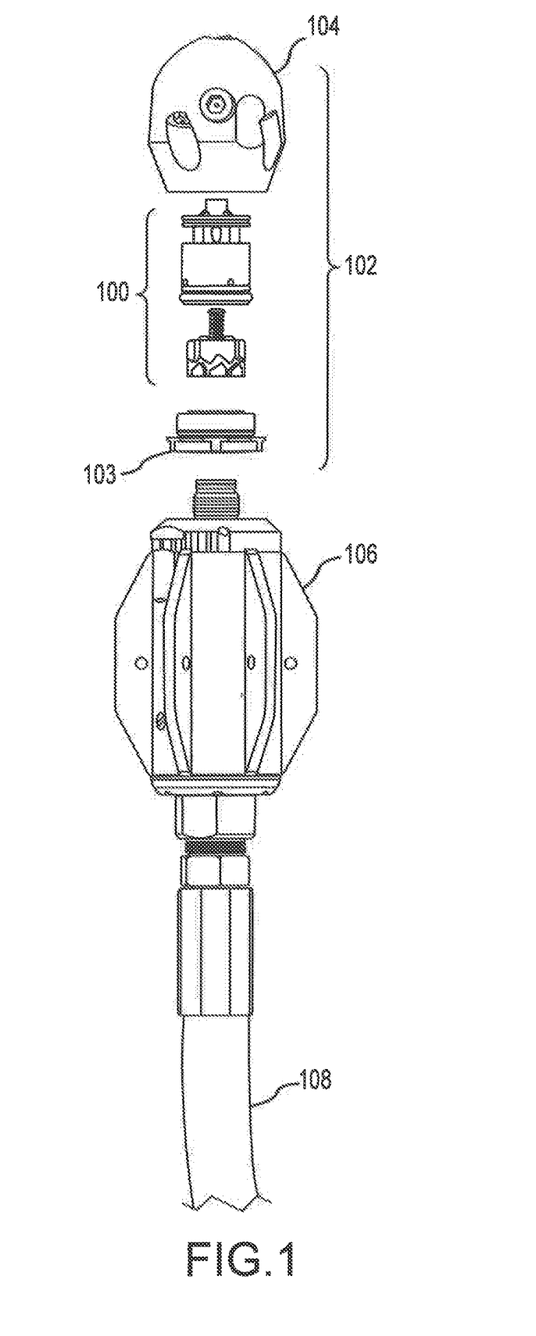
FIG. 1 is a partial exploded view of a switching nozzle head assembly in accordance with present disclosure fastened to a cleaning hose.
Figure 2:
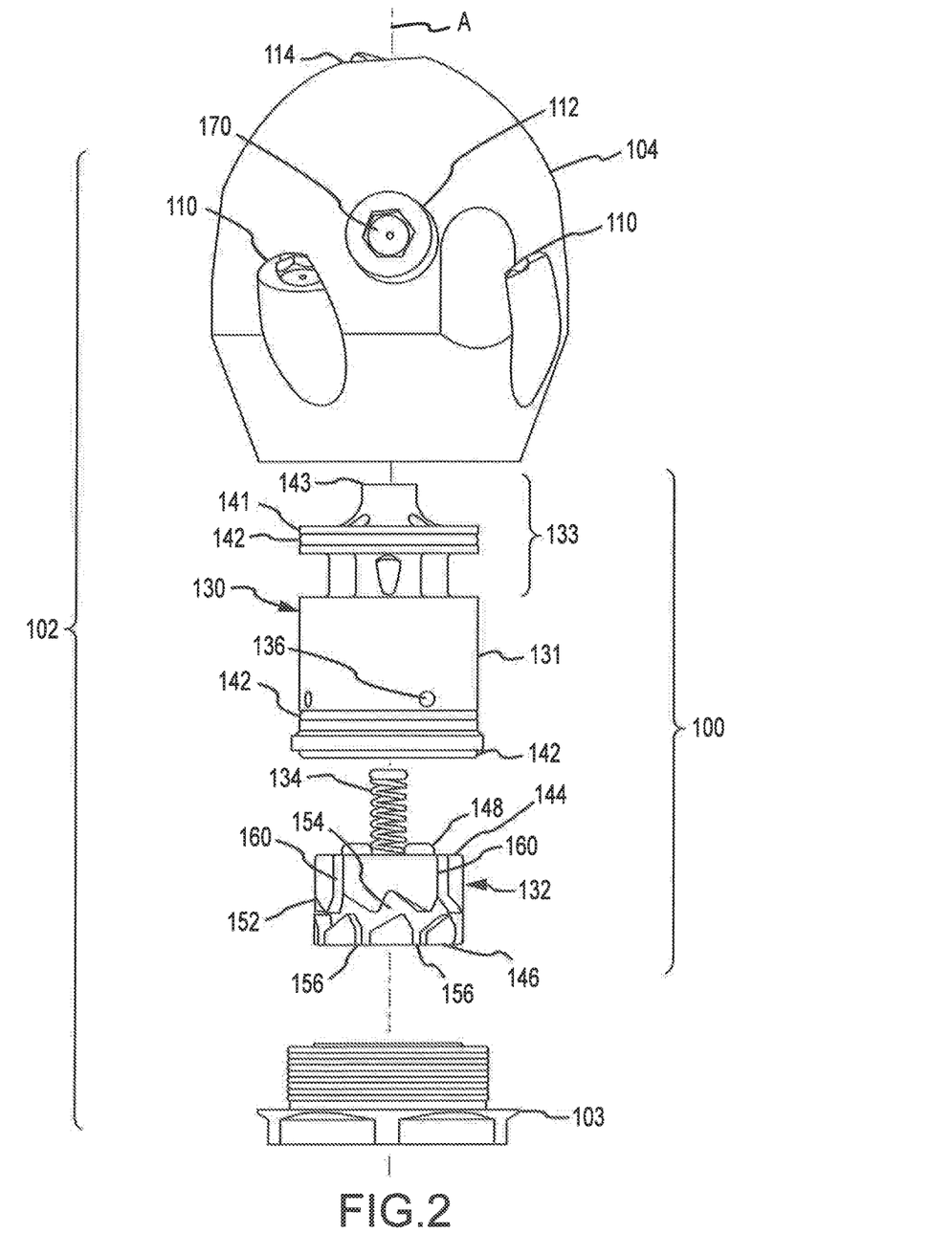
FIG. 2 is an enlarged exploded view of the switching nozzle head assembly shown in FIG. 1.
Figure 3:
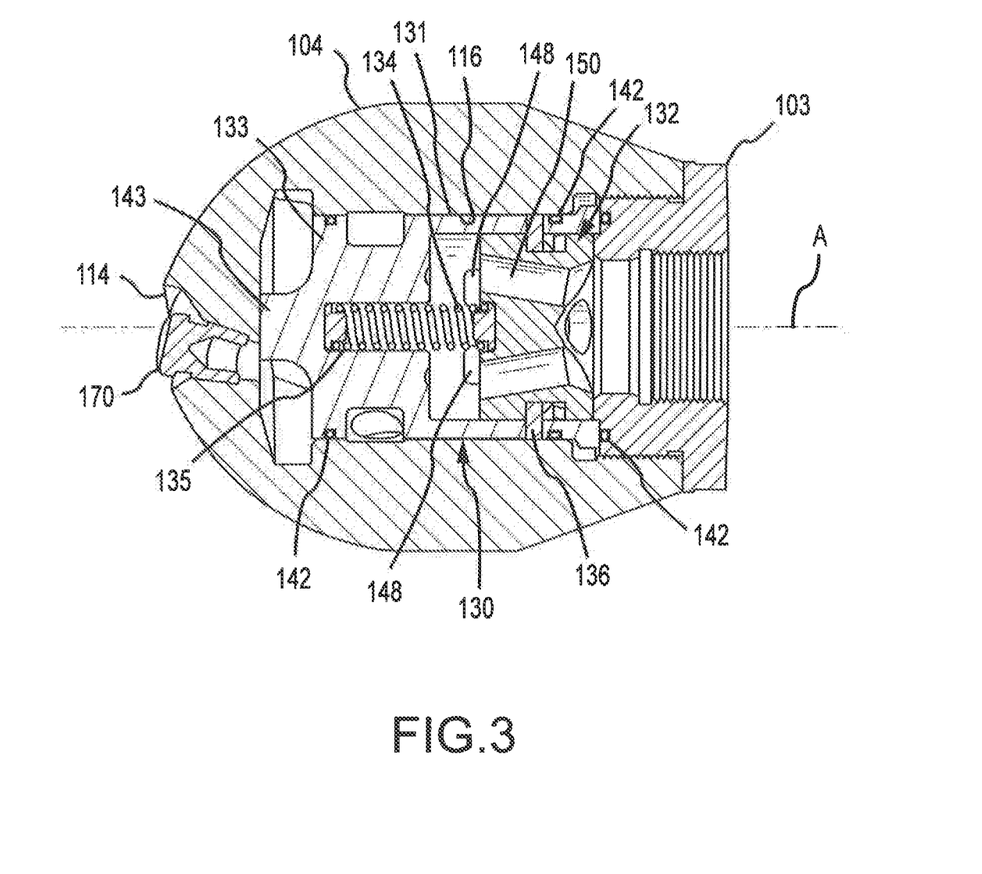
FIG. 3 is an axial cross sectional view through an assembled switching nozzle head assembly in an unpressurized condition.
Figure 4:
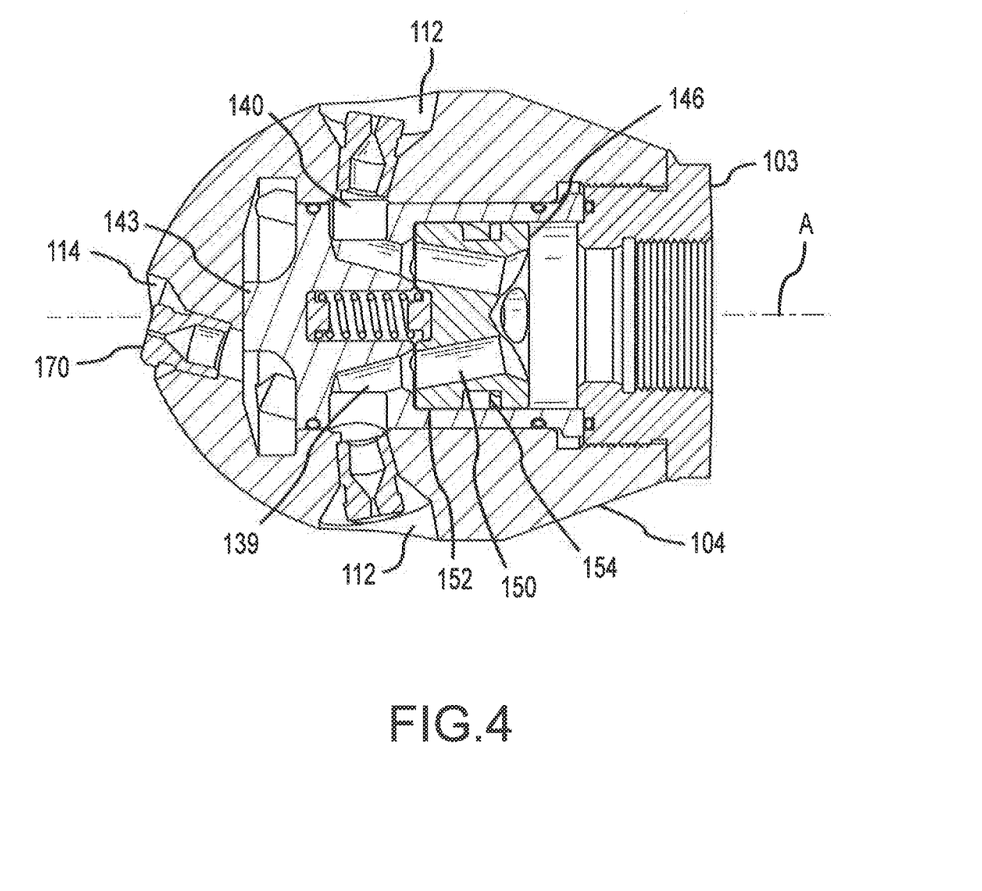
FIG. 4 is an axial cross sectional view through the nozzle head assembly shown in FIG. 3 in a pressurized condition with flow directed to cleaning ports.
Figure 5:
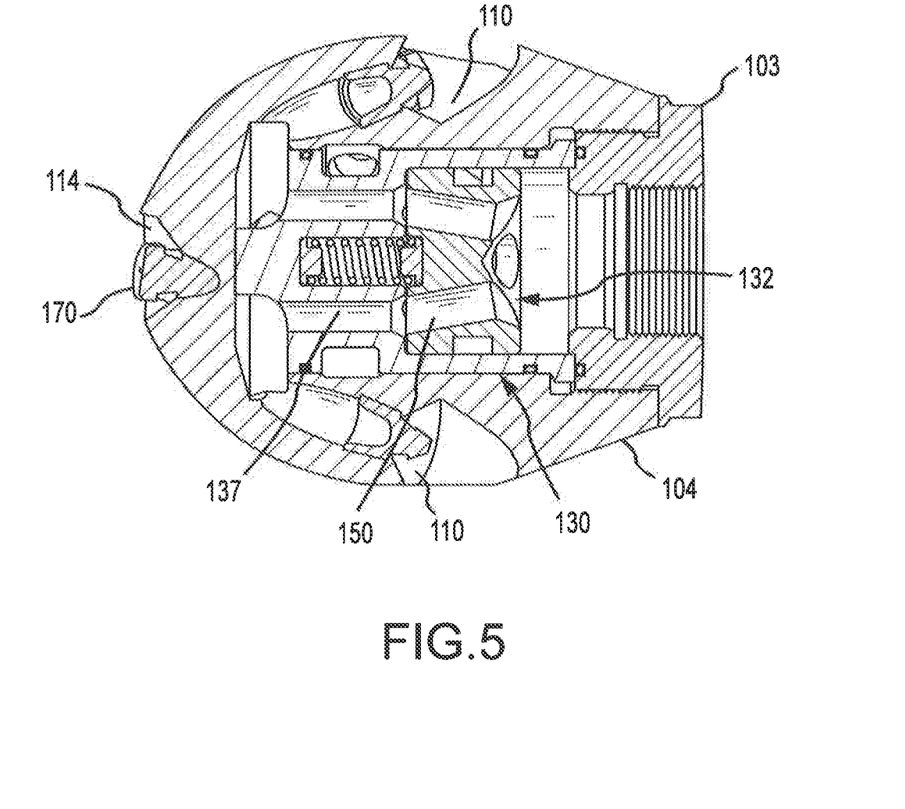
FIG. 5 is an axial cross sectional view through the nozzle head assembly rotated 45 degrees from that shown in FIGS. 3 and 4, with the poppet directing flow to tractor ports.
Figure 6:
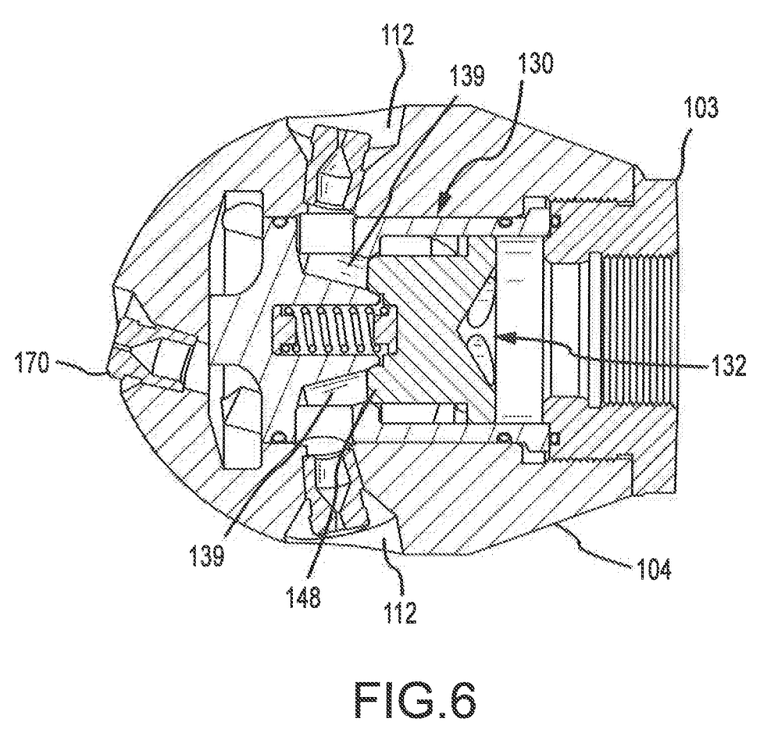
FIG. 6 is an axial cross sectional view through the nozzle assembly as in FIG. 4 with flow plugged from passage to the cleaning ports.
Figure 7:
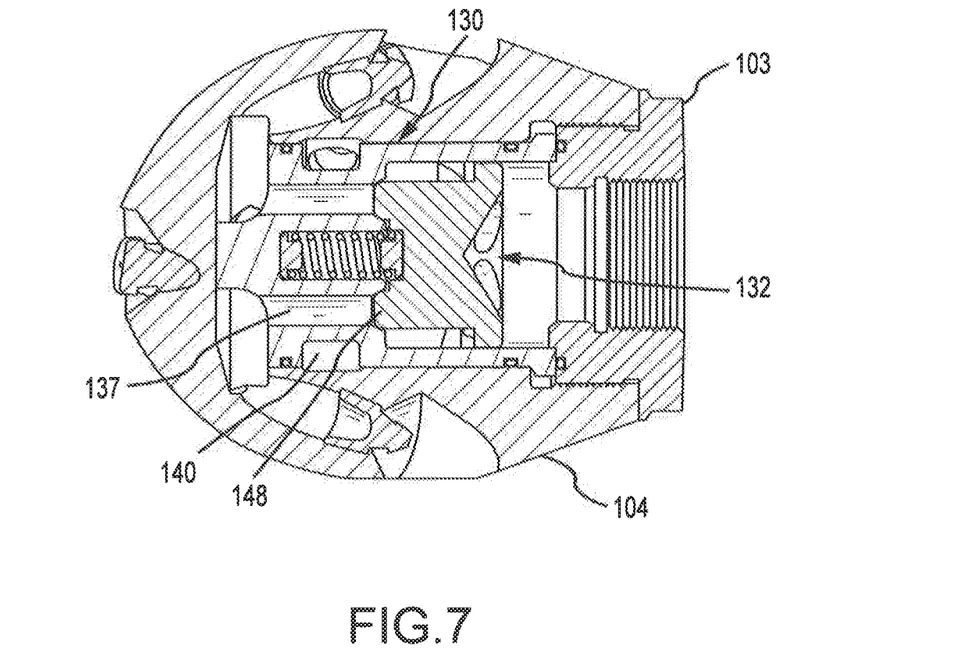
FIG. 7 is an axial cross sectional view through the nozzle assembly as in FIG. 5, showing the poppet preventing fluid flow to the tractor ports.

An exemplary embodiment of a nozzle assembly incorporating a switching valve assembly is shown in FIGS. 1 through 7. Note that the cross sectional views of FIGS. 3, 4 and 6 are axial cross sectional views showing the cleaning nozzle ports passing out of the side of the nozzle head body. FIGS. 5 and 7 are axial cross sectional views of the same assembly rotated 45 degrees, with the cut going through a pair of tractor nozzle ports.

Turning now to FIG. 1, a partial exploded view of a pipe cleaning assembly with a nozzle assembly 102 incorporating a cartridge assembly 100 in accordance with an exemplary embodiment of the present disclosure is shown. The nozzle assembly 102 includes a hollow nozzle head body 104 that houses the cartridge assembly 100 captured within the nozzle body 104 by a threaded retainer nut 103. The assembly 102 is in turn threaded or otherwise fastened via retainer nut 103 to a distal end of a rotating bearing coupling assembly 106 such as is disclosed in U.S. Pat. No. 6,059, 202, which is, in turn, fastened to the distal end of a high pressure fluid hose 108.

A separate enlarged exploded view of the nozzle assembly 102 is shown in an exploded view in FIG. 2. The cartridge assembly 100 comprises a cartridge body 130, a coil spring 134 and a poppet 132.

The nozzle head, or body, 104 in this exemplary embodiment, is generally symmetrical about its longitudinal axis "A" and has a set of four circumferentially spaced apart tractor ports 110, a set of four cleaning ports 112, and a front cleaning port 114. Each of these ports 110, 112, and 114 passes into a central band bore 116 into which the cartridge 100 is installed. The ports 110 and 114 extend into a bottom annulus portion of the central blind bore 116. The ports 112 intersect a side portion of the central blind bore 116, spaced from the bottom annulus portion of the central blind bore 116.

Each of these ports is positioned/directed at an angle from, or displaced off center from the longitudinal axis A of the nozzle body 104 so as to impart a rotational moment to the nozzle body 104 during device operation. The angle from the axis causes forward traction, or neutral (no pulling), or retarding in the case of a forward cutting nozzle. It is only the radial offset that imparts a rotational moment to the nozzle body. As a result, during operation of the cartridge assembly 100, the nozzle body 104 spins on the bearing assembly 106. The bearing assembly 106 typically is designed to allow spinning of the nozzle assembly 102 at a controlled rate.

The choice of and direction of ports 110, 112, and 114 may be modified in different nozzle heads 104, depending on the particular cleaning application for which the nozzle assembly 102 is designed. For example, the precise angular position, number and offset of each of the ports may be changed as well as the number of sets of ports depending on operational needs for a specific application. Provided the same radial spacing of the port openings into the central blind bore 116 remains the same, a variety of nozzle head configurations may utilize the same cartridge 100 as described below. Furthermore, all of the wear parts in the switching valve mechanism of the nozzle assembly 102 are contained in the cartridge 100 such that repair is simplified by simple cartridge replacement when required.

The cartridge 100 comprises a cup shaped cartridge case 130, a poppet 132, and a biasing spring 134. The cartridge 100 is assembled into the central blind bore 116 in the nozzle body 104 and captured therein via the threaded retainer nut 103. The threaded retainer nut 103 has a peripheral face groove holding a seal O-ring 142 which engages a rear annular face of the cartridge case 130 to capture the cartridge case 130 within the nozzle body 104. The cartridge case 130 carries a pair of spaced O-rings 142 in corresponding peripheral grooves to center and seal the cartridge 100 in place in the bore 116.

The cartridge case 130 has a cup shaped rear portion 131 and a solid front portion 133. The front portion 133 has a distal end 143 for engaging the bottom of the central blind bore 116 in the nozzle body 104, an annular rim 141, and an annular channel 140 around the front portion 133 separating the front portion 133 from the rear portion 131. The front portion 133 also has a central axial blind bore 135 for receiving therein one end of the spring 134. The front portion 133 also preferably has four axially extending, equally spaced apart bores 137 alternating with four angled bores 139. The four axially extending bores 137 are symmetrically spaced 90 degrees apart about the central axis A. The angled bores 139, also 90 degrees apart, are symmetrically spaced between the four axially extending bores 137. Thus there is a bore 137 or 139 every 45 degrees around the central axis A through the cartridge case 130.

Each of these angled bores 137 communicates with the annular channel 140 around the solid front portion 133 of the cartridge case 130. The disc shaped rim 141 of the front portion 133 carries an O-ring 142 that isolates the annular channel 156 from the distal end 143. The cartridge case 130 also has four equally spaced guide pins 136 that extend radially inward through the side wall of the cup shaped rear portion 131. These guide pins are press fit through the side wall of the rear portion 131, and are used to control position of the poppet 132 within the cartridge case 130 as explained further below. The cartridge case 130 requires no specific orientation about axis A when installed within the blind bore 116 of the nozzle body 104.

The poppet 132 is basically a solid cylindrical body having a front end 144 and a rear end 146. The front end 144 has a flat radial face with four symmetrically spaced protruding lugs 148 spaced 90 degrees radially apart about the axis A. Between these lugs 148 are four equally spaced axially extending through bores 150, again equally spaced 90 degrees apart about the axis A. Each of the lugs 148 acts as a valve disk to one of the bores 137 and 139 depending on the rotational position of the poppet 132 within the cartridge case 130.

The exemplary poppet 132 has an outer side wall 152 that has a zig-zag pattern annular cam groove 154 formed in the side wall 152 fully around the periphery of the poppet 132. This cam groove 154 is sized complementary to the diameter and depth of the pins 136 that project radially inward from the side wall of the rear portion 131 of the cartridge case 130. When the cartridge 100 is fully assembled, the pins 136 ride in the cam groove 154. This cam groove 154 has forward notches or vertices 156 each rotationally spaced about 45° apart along the groove 154. The cam groove 154 also has rear notches 158 spaced alternatingly with four axial grooves 160 spaced about 90° apart. These axial grooves 160 merge with the cam groove 154 at an angular rotation position between the rear notches 158 in the groove 154.

Each of the four guide pins 136 ride in the cam groove 154 when the valve cartridge 100 is fully assembled. The sides of the cam groove 154 are angled toward the sequential forward and rear notches or vertices 156 and 158 of the groove 154 such that when the poppet 132 moves forward and back as flow is applied or reduced, the poppet 132 has to rotate about 22.5° clockwise each time as it moves either forward or back with each change in flow above and below a predetermined threshold rate.

When fluid flow is off, as is shown in FIG. 3, or at least reduced below the predetermined threshold, determined by the spring rate of the spring 134, the poppet 132 is pushed by the spring 134 rearward so that it rests against the nut 103. At the same time, the poppet 132 is rotated 22.5° clockwise. The guide pins 136 shown in FIG. 3 are either resting against the forward notches 156 or riding within the axial grooves 160.

In this intermediate position, the poppet 132 rests against the nut 103. In this position, the passages 150 through the poppet 132 are open to all the passages in the cartridge case 130, i.e. the axial passages 137 and angled passages 139 to all the ports 110, 112 and 114. However, fluid pressure is either off or low at this point.

If the position of the poppet 132 before flow decrease had been as shown in FIG. 4, i.e., with flow through the angled passages 139 to the annular channel 140 to the cleaning nozzle ports 112, then, when fluid flow is again turned on, the poppet 132 again is moved forward by the fluid flow against the inlet end portion of the poppet 132, but this time moves the poppet 132 moves forward and rotates 22.5° clockwise to the position shown in FIG. 5. In this position, the passages 150 are aligned with the axial passages 137 to the tractor ports 110 and front cleaning port 114. At the same time, the four lugs 148 on the poppet end 144 close the four angled bores 139 to the cleaning nozzles 112, as is shown in FIG. 6.

When flow is subsequently reduced below the predetermined threshold, such as by the operator turning off flow, the poppet 132 rotates about 22.5° as the spring 134 pushes the poppet 132 rearward, via engagement with the stationary guide pins 136 to cause rotation and axial movement to an intermediate position, again as is shown in FIG. 3, except rotated one notch 156 further by 22.5°. This rotation is caused by the interaction between the stationary guide pins 136 riding in the groove 154 forcing rotation of the poppet 132 as the spring 134 pushes the poppet rearward.

Then, when flow is again increased above the predetermined threshold, the poppet 132 rotates about 22.5° again as fluid flow pushes the poppet 132 forward, to the position shown in FIGS. 4 and 7. When the poppet 132 is in this position, the passages 137 are plugged via the lugs 148, and the passages 150 are directly aligned with the angled bores 139 to the annular channel 140 and the cleaning ports 112. Since the ports 137 are plugged as is shown in FIG. 7, there is no flow available to the traction ports 110. Thus, while flow is directed through the cleaning ports 112, flow is positively prevented through the traction ports 110.

Each cycle of fluid flow/pressure application causes about a 45° rotation of the poppet 132 and hence an alternation between fluid flow being directed to forward port 114 and traction ports 110 and between cleaning ports 112. Since all of these ports are preferably offset from a direct radial orientation, a rotational torque is applied to the nozzle body 104 to cause nozzle head rotation when fluid pressure is applied. Finally, each of the ports 110, 112 and 114 each preferably has a threaded jet tip 170 installed. These jet tips 170 may also be of different configurations depending on the task to be performed.

It is to be understood that various changes can be made to the nozzle body 104 and to the switching valve cartridge 100 in accordance with the present disclosure. For example, the nozzle head body 104 may be configured with a different number of ports 110 and 112 and the corresponding poppet 132 and case 130 in the cartridge 100 would thus have a different number of openings and passages. The same cartridge 100 may be utilized in a variety of nozzle head bodies 104 each with a different set of angled ports. The angles and offsets utilized may be tuned to achieve specific rotational torques at designed pressures and flow rates. Additionally, the lugs 148 on the poppet 132 may be replaced with a flat face seal. The cartridge 100 could also be used in a non-rotary nozzle or flow diversion design in-line along a hose. All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A switching valve cartridge for use in a nozzle body having a central bore, the cartridge comprising:
    a generally tubular cartridge case having a front portion and a cup shaped rear portion, the front portion having a peripheral annular channel and a first plurality of axial bores therethrough for axial passage of fluid out of the front portion and a second plurality of bores therethrough for passage of fluid to the annular channel;
    a cylindrical poppet slidably disposed in the rear portion of the cartridge case, the poppet having a plurality of axially extending poppet bores therethrough;
    a biasing member within the rear portion of the cartridge case between the front portion and the poppet biasing the poppet away from the front portion of the cartridge case; and
    a guide member between the rear portion of the cartridge case and the poppet engaging a corresponding feature on the poppet to rotate the poppet as it slides forward and rearward within the rear portion of the cartridge case.

2. The cartridge according to claim 1 wherein the poppet has a front face and a plurality of lugs protruding from the front face each closing one of the bores through the cartridge case when the poppet abuts against front portion of the cartridge case.

3. The cartridge according to claim 1 wherein when the poppet has a zig-zag peripheral annular groove engaging the guide member configured to cause the poppet to rotate a predetermined amount in only one direction about a central axis through the cartridge each time the poppet is slidably moved toward and away from the front portion of the cartridge case.

4. The cartridge according to claim 2 wherein the poppet has a plurality of axially extending bores therethrough.

5. The cartridge according to claim 4 wherein the bores through the poppet align with one or more of the bores through the cartridge case when the poppet abuts against the front portion of the cartridge case.

6. The cartridge according to claim 1 wherein the guide member is a pin fixed to the cartridge case that extends into a corresponding peripheral groove in the poppet.

* * * * *

UNITED STATES PATENT AND TRADEMARK OFFICE
CERTIFICATE OF CORRECTION

PATENT NO. : 9,702,136 B2
APPLICATION NO. : 14/962894
DATED : July 11, 2017
INVENTOR(S) : Andersen et al.

It is certified that error appears in the above-identified patent and that said Letters Patent is hereby corrected as shown below:

In the Specification

In Column 1, Line 13, delete "Feb. 14, 2012," and insert -- Feb. 6, 2012, --, therefor.

In Column 1, Line 25, delete "puffing" and insert -- pulling --, therefor.

In Column 4, Line 39, delete "band" and insert -- blind --, therefor.

In Column 5, Line 32, delete "angled bores 137" and insert -- angled bores 139 --, therefor.

In Column 5, Lines 36-37, delete "annular channel 156" and insert -- annular channel 140 --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*